US005559337A

United States Patent [19]

Ito et al.

[11] Patent Number: 5,559,337

[45] Date of Patent: Sep. 24, 1996

[54] PLASMA ION SOURCE MASS ANALYZING APPARATUS

[75] Inventors: Tetsumasa Ito; Yoshitomo Nakagawa, both of Chiba, Japan

[73] Assignee: Seiko Instruments Inc., Japan

[21] Appl. No.: 302,503

[22] Filed: Sep. 8, 1994

[30] Foreign Application Priority Data

Sep. 10, 1993 [JP] Japan .................................... 5-226098

[51] Int. Cl.[6] ............................. H01J 27/00; H01J 49/00; B01D 59/44

[52] U.S. Cl. ........................................ 250/423 R; 250/288

[58] Field of Search .................................... 250/281, 288, 250/423 R, 305

[56] References Cited

U.S. PATENT DOCUMENTS

| | | | |
|---|---|---|---|
| 3,626,178 | 12/1971 | Cohen | 250/288 |
| 3,786,249 | 1/1974 | Anbar et al. | 250/288 |
| 4,963,735 | 10/1990 | Okamoto et al. | 250/281 |
| 4,999,492 | 3/1991 | Nakagawa | 250/288 |
| 5,049,739 | 9/1991 | Okamoto | 250/281 |
| 5,153,433 | 10/1992 | Andresen et al. | 250/296 |
| 5,357,107 | 10/1994 | Ibach et al. | 250/305 |

*Primary Examiner*—Bruce C. Anderson
*Attorney, Agent, or Firm*—Adams & Wilks

[57] ABSTRACT

In order to provide an ion beam lens to which a film causing a charge and rendering the analysis unstable will not adhere, the ion lens is provided with a deflector for deflecting an ion beam 90°. The side of the deflector opposite the sampling interface is provided with an opening. Also, a correction electrode having at least a pair of elements is interposed between the deflector and a mass filter. Not only may a minute amount of impurities in a sample be detected, but also measurements may be conducted on a consistently stable basis.

19 Claims, 3 Drawing Sheets

F I G. 2
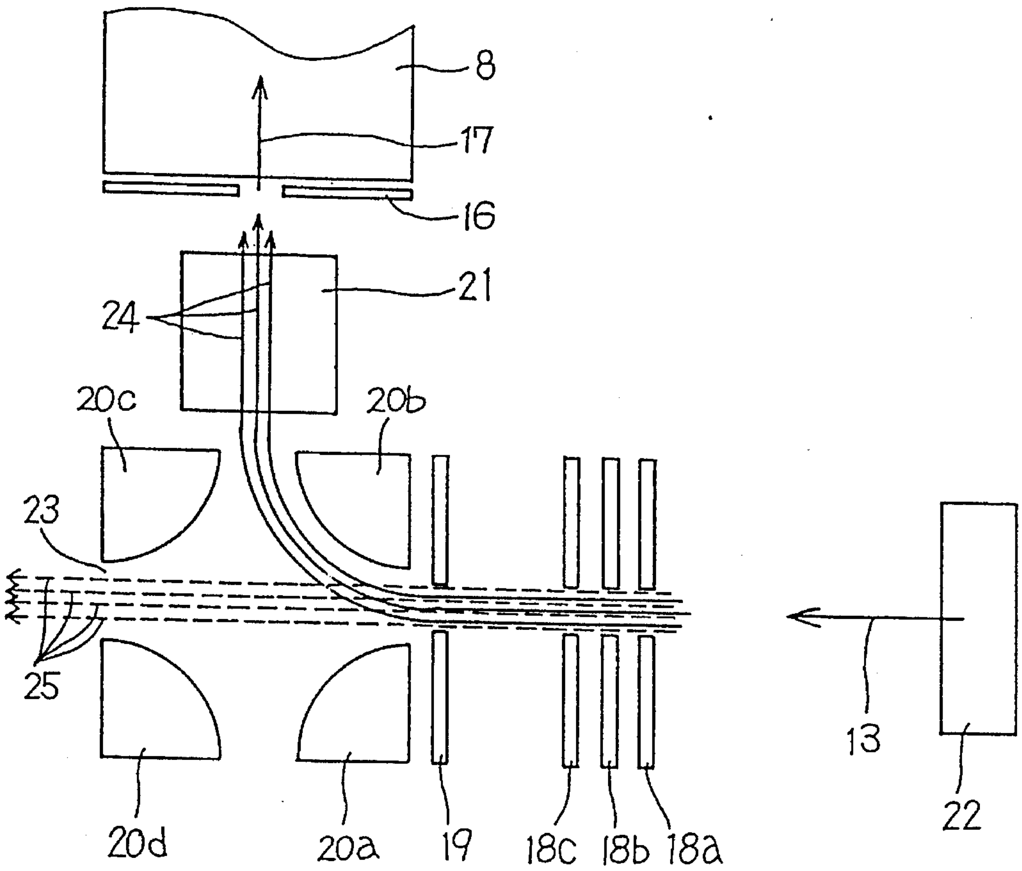
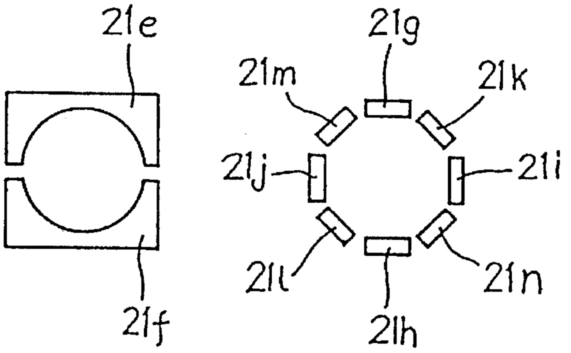
F I G. 3(a) F I G. 3(b)

PLASMA ION SOURCE MASS ANALYZING APPARATUS

BACKGROUND OF THE INVENTION

The present invention relates to a plasma ion source mass analyzing apparatus for specifying and measuring minute impurities in a sample. The term "plasma ion source mass analyzing apparatus" includes an inductive coupling plasma mass analyzing apparatus (referred to as ICP-MS) and a microwave induction plasma mass analyzing apparatus (referred to as MIP-MS).

An example of an arrangement according to the prior art will be explained with reference to FIG. 4. In FIG. 4, reference numeral 1 denotes a plasma generation apparatus, and numeral 2 denotes a plasma. The plasma generation apparatus may be, for example, an inductive coupled plasma generation apparatus disclosed in "ICP LIGHT EMISSION ANALYZER AND ITS APPLIANCE" by Haraguchi, Kodansha Scientific, or for example, a microwave plasma generation apparatus disclosed in Japanese Patent Application Laid-Open No. Hei 1-309360 (USP 4,933,650).

A sample (not shown) to be analyzed is introduced into the plasma 2 generated by the plasma generation apparatus 1 to be ionized. Numeral 3 denotes a sampling cone, numeral 4 denotes a skimmer cone, and numeral 5 denotes a vacuum pump. The sampling cone 3 which is provided at its tip with an opening having a diameter of 0.8 to 1.2 mm. The skimmer cone 4 is provided at its tip with an opening having a diameter of 0.3 to 0.6 mm. The sampling interface is composed of the sampling cone 3 and the skimmer cone 4. A space between the sampling cone 3 and the skimmer cone 4 is evacuated down to about 1 Torr by the vacuum pump 5 (for which a rotary pump is generally used) during the analysis.

Numeral 6 denotes a vacuum container, numeral 7 denotes an ion lens, numeral 8 denotes a mass filter, numeral 9 denotes a detector, and numeral 12 denotes a data processor. The interior of the vacuum container 6 is evacuated by two different vacuum pumps 5 and 5 and is maintained in a vacuum condition of about $10^{-4}$ Torr in a chamber where the ion lens 7 is disposed and in a vacuum condition of about $10^{-6}$ Torr in a chamber where the detector 9 is disposed. In general, turbo molecular pumps or oil diffusion pumps are used as these vacuum pumps 5 and 5.

The sample which has been ionized by the plasma 2 reaches the ion lens 7 through the openings of the sampling cone 3 and the skimmer cone 4 together with light of the plasma. The ion lens 7 serves to introduce, into the mass filter 8, only the ions, out of all the ions and light, which have reached the ion lens. The mass filter 8 serves to pass only a predetermined mass of ions out of all the ions which have reached the mass filter 8. For example, a quaternary pole mass analyzer is used as the mass filter 8.

The detector 9 detects the ions which have passed through the mass filter 8 and sends a corresponding electric signal to the data processor 12. For example the detector 9 may be a commercially available device, such as that sold under the trademark CHANNELTRON produced, a Channeltron made by Galileo company. In the data processor 12, the mass of the ions is calculated from setup values of the mass filter 8 when it is detected by the detector 9 and the type of ion is determined. Then, the data processor 12 calculates the concentration of the ions specified by the detecting strength of the detector 9, i.e., the impurities contained in the sample.

The ion lens 7 will now be explained with reference to FIG. 5. FIG. 5 is a schematic cross-sectional view of the ion lens and its vicinity. Numeral 13 denotes a sampling interface axis, characters 14*a*, 14*b* and 14*c* denote electrodes, characters 15*a* and 15*b* denote deflectors, numeral 16 denotes an aperture, and numeral 17 denotes a mass filter axis. The ion lens 7 is composed of the electrodes 14*a*, 14*b* and 14*c*, the deflectors 15*a* and 15*b* and the aperture 16.

The sampling interface axis 13 extends through centers of the opening of the sampling cone 3 and the opening of the skimmer cone 4. An ion beam which has passed through the opening of the skimmer cone 4 reaches the ion lens 7 along the sampling interface axis 13. A convergent lens is formed by the three electrodes 14*a*, 14*b* and 14*c* each of which is in the form of a plate having an opening at its center along the sampling interface axis 13. When suitable voltages are applied to the electrodes 14*a*, 14*b* and 14*c*, respectively, the beam is converged. Such a convergent lens is referred to as an Einzel lens.

The master filter axis 17 corresponds to an optical axis which is reached by the ion beam converged to the mass filter 8. The mass filter axis 17 is located in parallel with an interval of about 10 mm relative to the sampling interface axis 13. The aperture 16 is in the form of a plate having an opening about the mass filter axis 17. When a suitable voltage is applied thereto, the aperture serves to send the ion beam having a suitable energy to the mass filter 8. The aperture 16 is not necessarily a single opening and may be instead composed of a plurality of elements. For example, the deflectors 15*a* and 15*b* are composed of planar parallel type deflectors, respectively. The deflectors 15*a* and 15*b* cause the ion beam, which has been converged along the sampling interface 13, to pass through the mass filter axis 17. Namely, they serve to deflect the converged ion beam.

The ion lens 7 thus arranged serves to introduce into the mass filter 8 the ion beam to be detected as described above, and at the same time serves to prevent the light of the plasma 2, which adversely affects the detector 9 as a background noise, from reaching the mass filter 8 by causing the light to advance in the ion lens 7 and collide against the aperture 16.

Since a neutral component which has not completely been ionized by the plasma 2 is present in addition to the abovedescribed ions and the light produced by the plasma 2 is also present as a component which pass through the skimmer cone 4, the following problems are noticeable. The neutral component is forwardly advanced as is the light in the ion lens 7 to collide against the aperture 16 and from a film. The main component of the neutral component is a structural component of the sample, and the film stuck to the aperture 16 hardly has electric conductivity. The film is then, however, charged to have an unstable surface potential. Namely, if this film is stuck to the ion lens 7, an electric field in the interior of the ion lens 7 becomes unstable, a path of the beam of ion to be detected is unstable and as a result, it is impossible to effect a stable measurement. In the prior art, due to an excessive influence exerted by the film troublesome and time consuming work has to be carried out requiring that the ion lens be removed while stopping the apparatus to permit it to be dismantled and cleaned.

SUMMARY OF THE INVENTION

According to the present invention, a plasma ion source mass analyzing apparatus has as an object thereof the specifying and measuring of a minute amount of impurities contained in a sample a plasma ion source for ionizing said sample in a plasma, a sampling interface for introducing the produced ion into a vacuum container, an ion lens, a mass filter and a detector disposed in said vacuum container, the apparatus being characterized in that an axis of said sampling interface and an axis of said mass filter are arranged to define an angle of 90°, said ion lens has a 90° deflector for 90° deflecting a beam of said ion that has passed said sampling interface, and said 90° deflector is opened on a side opposite to said sampling interface.

In a preferred embodiment plasma ion source mass analyzing apparatus is characterized in that said 90° deflector has quaternary electrodes for forming a quaternary pole field, and the beam of said ion that has passed through said sampling interface is incident from one axis A of said quaternary pole field, emergent from an axis B that is present in a direction at an angle of 90° relative to said axis A, and introduced into said mass filter.

In another preferred embodiment, the plasma ion source mass analyzing apparatus is characterized in that a correction electrode composed of at least one pair of elements is interposed between said 90° deflector and said mass filter in said ion lens, and the correction voltage is applied to said correction electrode whereby the beam of said ion that has been emergent from said 90° deflector is introduced accurately to a predetermined position of said mass filter.

In the plasma ion source mass analyzing apparatus according to the present invention, after the sample ion to be analyzed has passed through the sampling interface, it is 90° deflected by the 90° deflector and introduced into the mass filter to be separated on the mass basis and detected. In contrast, the light of the plasma and the neutral component that has not been ionized by the plasma are advanced straightly in the 90° deflector and are discharged outwardly of the ion lens from the opening of the 90° deflector to the sampling interface. Accordingly, not only will the light of the plasma which serves as a background noise not reach the deflector through the mass filter but also the neutral component will not collide in the ion lens to form a film which causes a charge.

Also, the correction electrodes composed of at least one pair of elements is interposed in between the 90° deflector and the mass filter, and the correction voltage is applied to the correction electrode, whereby it is possible to converge and accurately introduce the ion beam to a predetermined position of the mass filter in a point-like manner.

As a result, it is possible to detect stably the ion with a high efficiency and to carry out a highly reliable analysis.

BRIEF DESCRIPTION OF DRAWINGS

FIG. 2 is a plan view showing the ion lens and its vicinity.

FIGS. 3 (*a*) and 3 (*b*) are views for the supplementary explanation of the correction electrodes.

DETAILED DESCRIPTION

Figure 1:
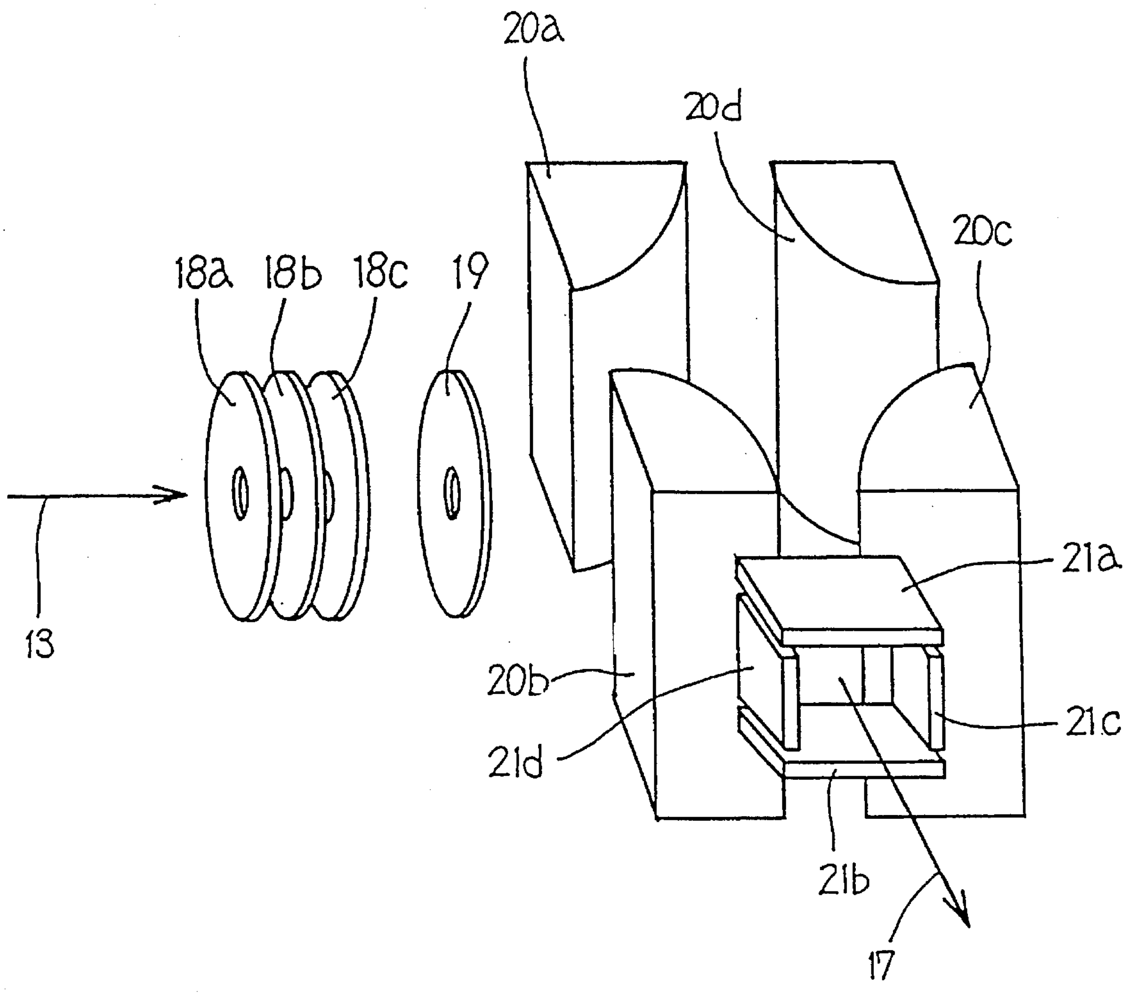
FIG. 1 is a structural view of an ion lens according to the present invention.
Figure 4:
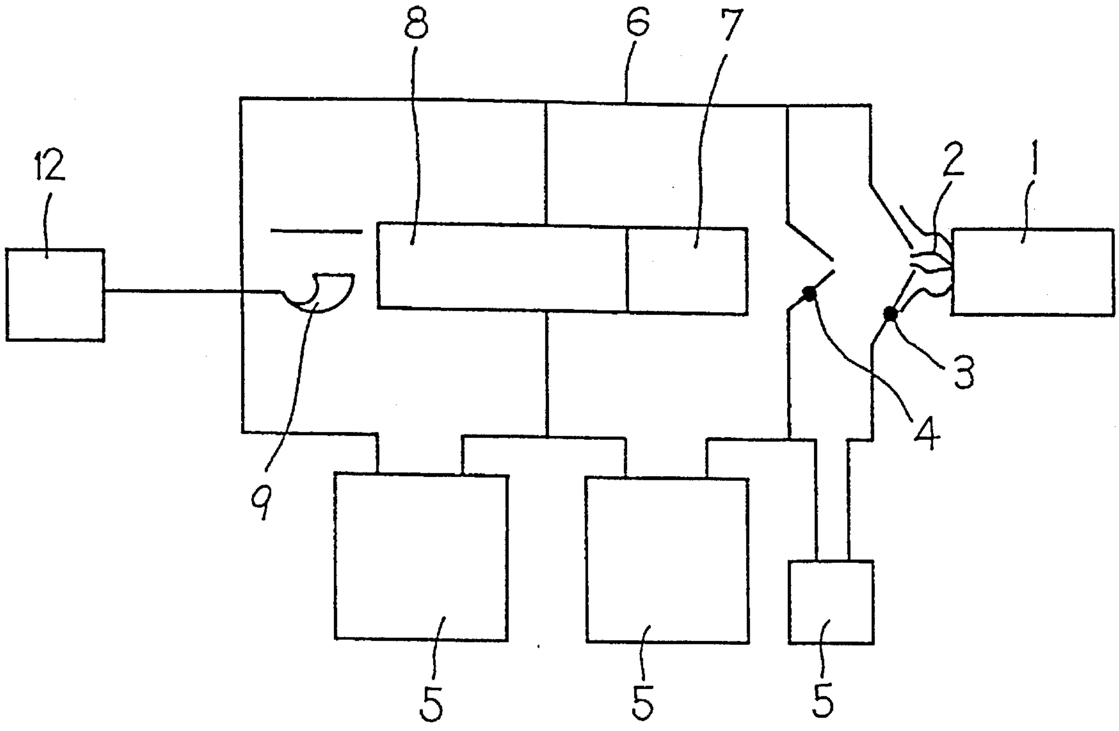
FIG. 4 PRIOR ART
FIG. 4 is a view showing a structural example of a plasma ion source mass analyzer.
Figure 5:
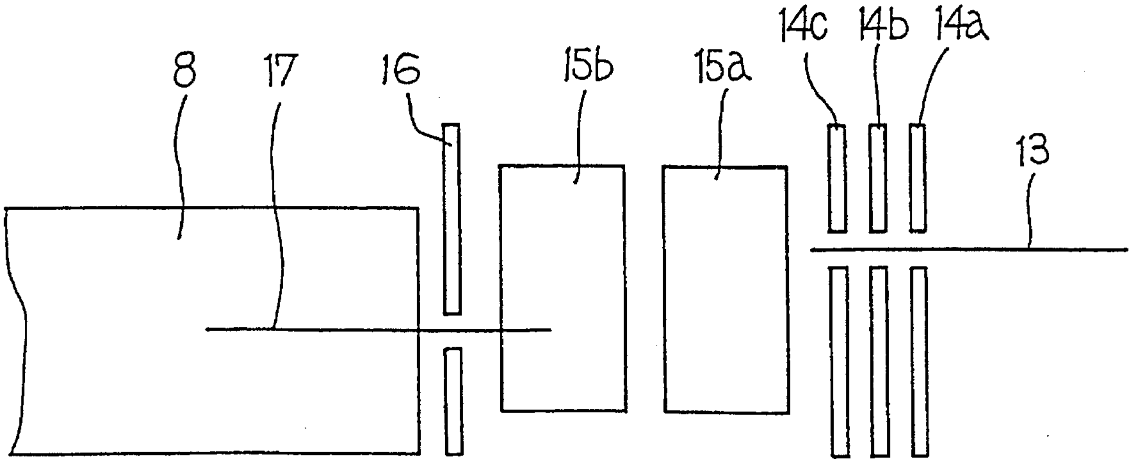
FIG. 5 PRIOR ART
FIG. 5 is a schematic view showing an ion lens according to the prior art.

An embodiment of the present invention will now be described in detail with reference to the drawings. FIG. 1 is a schematic perspective view showing an ion lens according to the present invention. In FIG. 1, reference numeral 13 denotes a sampling interface axis, numeral 17 denotes a mass filter axis, numerals characters 18*a*, 18*b* and 18*c* denote electrodes, numeral 19 denotes an inlet aperture, reference numbers 20*a*, 20*b*, 20*c* and 20*d* denote quaternary electrodes, and numerals 21*a*, 21*b*, 21*c* and 21*d* denote correction electrodes. An ion lens is composed of the electrodes 18*a*, 18*b* and 18*c*, the inlet aperture 19, the quaternary electrodes 20*a*, 20*b*, 20*c* and 20*d* and the correction electrodes 21*a*, 21*b*, 21*c* and 21*d*. The electrodes 18*a*, 18*b* and 18*c* have openings having centers about the sampling interface axis 13 to form an Einzel lens. When suitable voltages are applied to the electrodes 18*a*, 18*b* and 18*c*, it is possible to converge the beam of ions which enters along the sampling interface axis 13 so that the beam is focused at a distance in the vicinity of the inlet of the mass filter 8 (not shown). The quaternary electrodes 20*a*, 20*b*, 20*c* and 20*d* are arranged in parallel by longitudinally dividing a cylinder into one fourths and facing their curved surfaces inward. A 90° deflector is composed of the quaternary electrodes 20*a*, 20*b*, 20*c* and 20*d*. The voltages are applied to the respective quaternary electrodes to form the quaternary electrode field under the conditions given by:

$$V20a=V20c$$

$$V20b=V20d$$

where V20*a*, V20*b*, V20*c* and V20*d* are the voltages applied to the quaternary electrodes 20*a*, 20*b*, 20*c* and 20*d*. It is ideal for the inside curves surfaces of the quaternary right angled electrodes to be hyperboloids but this may be simulated by the cylindrical surface electrodes of present the embodiment. The sampling interface (not shown), the ion lens and the mass filter (not shown) are arranged so that one axis A of the quaternary pole field is coincident with the sampling interface axis 13 and an axis B of the quaternary pole field which is present in a direction perpendicular to the axis A is coincident with the mass filter axis 17. If the average voltage to be applied to the electrodes 20*a*, 20*b*, 20*c* and 20*d* is represented by Vav, when about 0.2 Vav is applied to the electrodes 20*a* and 20*c* and about 1.8 Vav is applied to the electrodes 20*b* and 20*d*, the ion beam introduced into the quaternary pole field along the sampling interface axis 13 (axis A) is deflected at an angle of 90° is emergent along the mass filter axis 17 (axis B).

As will be appreciated by those of ordinary skill in the art, the arrangement of the sampling interface axis and the mass filter axis of the ion lens involves errors of machining or assembling of the individual parts. Accordingly, the ion beam which is emergent from the 90° deflector will not always correctly reach a predetermined position of the mass filter. A leakage of an electric field to an unintended place of the ion lens (which leakage is referred to as a fringing field) is produced. Accordingly, the ion beam which is emergent from the 90° deflector will not always converge into a spot at a predetermined position of the mass filter. Accordingly, the correction electrodes 21*a*, 21*b*, 21*c* and 21*d* are interposed between the 90° deflector and the mass filter to thereby effect the correction of the ion beam position and the ion beam shape, as a result of which the ion beam is converged at a predetermined position of the mass filter. The correction electrodes 21*a* and 21*b* and the correction electrodes 21*c* and 21*d* face each other to form pairs, respectively. The correction voltages Dx, Dy, Sx, and Sy are applied under the condition given by:

$$V21a=Vav+Dx+Sx$$

$V21b=Vav-Dx+Sx$ $V21c=Vav+Dy+Sy$ $V21d=Vav-Dx+Sy$ where V21*a*, V21*b*, V21*c* and V21*d* are the voltages to be applied to the correction electrodes 21*a*, 21*b*, 21*c* and 21*d*, respectively. The correction voltages Dx and Dy are used to correct the deflection of the ion beam in a direction from the electrode 21*a* to the electrode 21*b* and in a direction from the electrode 21*c* to the electrode 21*d*, respectively. Also, the correction voltages Sx and Sy are used to correct the shape of the ion beam in a direction from the electrode 21*a* to the electrode 21*b* and in a direction from the electrode 21*c* to the electrode 21*d*, respectively. The correction electrode arrangement shown in FIG. 3*a* has two pairs but it may be composed of a single pair of correction electrodes 21*e* and 21*f* as shown in FIG. 3*a* or may be composed of four pairs of correction electrodes 21*g* and 21*h*, 21*i* and 21*j*, 21*k* and 211, and 21*m* and 21*n*. In this case, the larger the number of the pairs, the more accurate the correction will become, and the smaller the number of the pairs, the easier the correction work will become. The number of the pairs of the correction electrodes may be selected in correspondence with a width of a predetermined position (which is referred to an acceptance area in the quaternary pole mass analyzer) of the mass filter into which the ion is to be introduced. Also, the surfaces of the correction electrodes which face each other may be planar or cylindrical, to which the concept of the invention may be equally applied.

Paths of the ion beam and the light or the neutral component will now be explained. FIG. 2 is a plan view showing the vicinity of the ion lens shown in FIG. 1. In FIG. 2, the mass filter 8, the sampling interface axis 13, the aperture 16, the mass filter axis 17, the electrodes 18*a*, 18*b* and 18*c*, the inlet aperture 19, and the quaternary electrodes 20*a*, 20*b*, 20*c* and 20*d* have been described above and hence the explanation thereof will be omitted. Reference numeral 22 denotes a sampling interface which is composed of a sampling cone and a skimmer cone as described in conjunction with the prior art. The sampling interface 22 and the mass filter 8 are arranged so that the sampling interface axis 13 and the mass filter axis 17 define an angle of 90°. Reference numeral 21 denotes a correction electrode which is composed of the correction electrodes 21*a*, 21*b*, 21*c* and 21*d* which have been described with reference to FIG. 1. Reference numeral 23 denotes an opening portion which is a gap between the quaternary electrodes 20*c* and 20*d* and which corresponds to the opening on the opposite side of the 90° deflector, composed of the quaternary electrodes 20*a*, 20*b*, 20*c* and 20*d* to the sampling interface 22. Numeral 24 denotes the paths of the beam of ion. Numeral 25 denotes paths of the light and the neutral component. A minute amount of impurities contained in the sample to be detected are ionized in the plasma (not shown) and introduced into the ion lens along the sampling interface axis 13 as a beam of ions in the vacuum container through the sampling interface 22. The impurities are converged along the beam paths 24 within the ion lens, deflected at 90° and corrected to be introduced into the mass filter 8 with a high efficiency. They are separated on the mass basis and detected. In contrast, the plasma light and the neutral component which have not completely been ionized in the plasma are introduced into the ion lens along the sampling interface axis 13 but are not subjected to the static forces. Thus, the light and the neutral component are forwardly advanced as indicated by the paths 25 of the light and the neutral component and are discharged outside through the opening 23. In this way, since the neutral component will not collide against the structural parts of the ion lens, there is no danger that the film which causes the charge within the ion lens would be formed. Thus, the path 24 of the ion beam is stable.

According to the present invention, not only may the minute amount of impurities in the sample to be analyzed be effectively detected but also the film which causes the charge as a problem in the prior art will not adhere to the ion lens. Accordingly, it is possible to consistently carry out the detection in a stable manner. As a result, it is possible to effect a highly reliable analysis.

What is claimed is:

1. A plasma ion source mass analyzing apparatus for specifying and measuring a minute level of impurities in a sample, comprising: a plasma ion source for ionizing a sample, in a plasma; a vacuum container; a sampling interface for introducing the produced ions into the vacuum container; an ion lens disposed in the vacuum container for focusing the ions; a mass filter disposed in the vacuum container for separating ions by mass; and a detector disposed in the vacuum container for detecting the separated ions; wherein a 90° angle exists between an axis of the sampling interface and an axis of the mass filter, the ion lens has a deflector for deflecting an ion beam that has passed through the sampling interface by 90°, the deflector has a opening on a side opposite the sampling interface, and wherein the deflector has quaternary electrodes for forming a quaternary pole field, and an ion beam that has passed through the sampling interface is incident from an axis of the quaternary pole field, is emergent from an axis that is at an angle of 90° with respect to the axis of the quaternary pole field, and is introduced into the mass filter.

2. A plasma ion source mass analyzing apparatus according to claim 1; wherein the opening in the detector is formed on the axis of the sampling interface.

3. A plasma ion source mass analyzing apparatus according to claim 1; further comprising a second vacuum container for containing the plasma and the sample.

4. A plasma ion source mass analyzing apparatus according to claim 1; wherein the sampling interface comprises a sampling cone and a skimmer cone.

5. A plasma ion source mass analyzing apparatus according to claim 4; wherein the sampling cone has an opening in an end thereof having a diameter of from 0.8 to 1.2 mm.

6. A plasma ion source mass analyzing apparatus according to claim 4; wherein the skimmer cone has an opening in an end thereof having a diameter of from 0.3 to 0.6 mm.

7. A plasma ion source mass analyzing apparatus for specifying and measuring a minute level of impurities in a sample, comprising: a plasma ion source for ionizing a sample in a plasma; a vacuum container; a sampling interface for introducing the produced ions into the vacuum container; an ion lens disposed in the vacuum container for focusing the ions; a mass filter disposed in the vacuum container for separating ions by mass; and a detector disposed in the vacuum container for detecting the separated ions; wherein a 90° angle exists between an axis of the sampling interface and an axis of the mass filter, the ion lens has a deflector for deflecting an ion beam that has passed through the sampling interface by 90°, the deflector has a opening on a side opposite the sampling interface, and wherein a correction electrode comprising at least one pair of elements is interposed between the deflector and the mass filter in the ion lens, and a correction voltage is applied to the correction electrode such that an ion beam that has been emergent from the deflector is introduced accurately to a predetermined position of the mass filter.

8. A plasma ion source mass analyzing apparatus for specifying and measuring a minute level of impurities in a sample comprising: a plasma ion source for ionizing a sample in a plasma; a vacuum container; a sampling interface for introducing the produced ions into the vacuum container; an ion lens disposed in the vacuum container for focusing the ions; a mass filter disposed in the vacuum container for separating ions by mass; and a detector disposed in the vacuum container for detecting the separated ions; wherein a 90° angle exists between an axis of the sampling interface and an axis of the mass filter, the ion lens has a deflector for deflecting an ion beam that has passed through the sampling interface by 90°, and the deflector has an opening on a side thereof opposite the sampling interface and includes quaternary electrodes for forming a quaternary pole field such that an ion beam that has passed through the sampling interface is incident from an axis of the quaternary pole field, is emergent from an axis that is at an angle of 90° with respect to the axis of the quaternary pole field, and is introduced into the mass filter.

9. A plasma ion source mass analyzing apparatus according to claim 8; further comprising a correction electrode comprising at least one pair of elements interposed between the deflector and the mass filter in the ion lens, such that when a correction voltage is applied to the correction electrode an ion beam which is emergent from the deflector is accurately introduced to a predetermined position of the mass filter.

10. A plasma ion source mass analyzing apparatus comprising: a plasma ion source for ionizing a sample in a plasma to produce ions; a vacuum chamber; a sampling interface for introducing the produced ions into the vacuum chamber; an ion lens for focusing the ions; a mass filter for separating the produced ions by mass; a deflector having quaternary electrodes for forming a quaternary pole field for deflecting by a given angle an incident ion beam from the ion lens into the mass filter; and a detector for detecting the separated ions; wherein a 90° angle exists between an axis of the sampling interface and the mass filter.

11. A plasma ion source mass analyzing apparatus according to claim 10; wherein the given angle is 90°.

12. A plasma ion source mass analyzing apparatus according to claim 10; wherein the ion lens is disposed in the vacuum chamber.

13. A plasma ion source mass analyzing apparatus according to claim 10; wherein the mass filter is disposed in the vacuum chamber.

14. A plasma ion source mass analyzing apparatus according to claim 10; wherein the detector is disposed in the vacuum chamber.

15. A plasma ion source mass analyzing apparatus according to claim 10; further comprising a correction electrode interposed between the deflector and the mass filter for correcting the angle of deflection of an ion beam deflected by the deflector such that the ion beam is deflected into the mass filter.

16. A plasma ion source mass analyzing apparatus according to claim 10; wherein the deflector has an opening in a side opposite the sampling interface and along the same axis as the sampling interface.

17. A plasma ion source mass analyzing apparatus according to claim 10; wherein the sampling interface comprises a sampling cone and a skimmer cone.

18. A plasma ion source mass analyzing apparatus according to claim 17; wherein the sampling cone has an opening in an end thereof having a diameter of from 0.8 to 1.2 mm.

19. A plasma ion source analyzing apparatus according to claim 17; wherein the skimmer cone has an opening in an end thereof having a diameter of from 0.3 to 0.6 mm.

* * * * *